United States Patent
Brück

(10) Patent No.: US 8,080,081 B2
(45) Date of Patent: Dec. 20, 2011

(54) HONEYCOMB BODY WITH AN AT LEAST PARTIALLY CERAMIC HONEYCOMB STRUCTURE AND A RECEPTACLE FOR A MEASUREMENT SENSOR, AND PROCESS FOR PRODUCING SUCH A HONEYCOMB BODY

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 598 days.

(21) Appl. No.: 11/825,081

(22) Filed: Jul. 2, 2007

(65) Prior Publication Data
US 2007/0266686 A1    Nov. 22, 2007

Related U.S. Application Data

(63) Continuation of application No. PCT/EP2005/013965, filed on Dec. 23, 2005.

(30) Foreign Application Priority Data

Dec. 30, 2004 (DE) .................... 10 2004 063 546

(51) Int. Cl.
*B01D 46/00* (2006.01)
(52) U.S. Cl. .......................................................... 55/523
(58) Field of Classification Search ............ 55/522–524; 422/168–182
See application file for complete search history.

(56) References Cited

U.S. PATENT DOCUMENTS

| | | | | |
|---|---|---|---|---|
| 4,415,344 A | * | 11/1983 | Frost et al. ....................... 55/523 |
| 4,671,809 A | * | 6/1987 | Taketomo et al. .................. 96/8 |
| 5,065,576 A | * | 11/1991 | Kanazawa et al. ............... 60/295 |
| 5,098,763 A | * | 3/1992 | Horikawa et al. .............. 428/116 |
| 5,104,627 A | * | 4/1992 | Usui et al. ...................... 422/171 |
| 5,171,341 A | * | 12/1992 | Merry .............................. 55/484 |
| 5,180,408 A | * | 1/1993 | Worner et al. .................... 55/482 |
| 5,294,411 A | * | 3/1994 | Breuer et al. .................. 422/174 |
| 5,549,725 A | * | 8/1996 | Kasai et al. ...................... 55/523 |
| 5,768,889 A | * | 6/1998 | Maus et al. ...................... 60/300 |
| 6,669,751 B1 | * | 12/2003 | Ohno et al. ...................... 55/523 |
| 6,670,020 B1 | | 12/2003 | Maus | |

(Continued)

FOREIGN PATENT DOCUMENTS
DE              88 16 154 U1       3/1989
(Continued)

*Primary Examiner* — Duane Smith
*Assistant Examiner* — Amber Orlando
(74) *Attorney, Agent, or Firm* — Laurence A. Greenberg; Werner H. Stemer; Ralph E. Locher

(57) ABSTRACT

A honeycomb body, in particular for use in the exhaust system of a motor vehicle, includes an at least partially ceramic honeycomb structure through which a fluid can flow. The honeycomb structure is disposed in a tubular casing and has cavities. The honeycomb body has at least two axial subregions in a longitudinal direction. The honeycomb structure is connected to the tubular casing in an axial securing region and an axial measurement sensor region has a recess for accommodating a measurement sensor in the honeycomb structure. The honeycomb body has a permanent connection between the tubular casing and the ceramic honeycomb structure due to its preferably force-locking and/or form-locking connection between the tubular casing and the honeycomb structure in the securing region. Despite the recess, further damage to the honeycomb structure in the measurement sensor region is avoided. A process for producing such a honeycomb body is also provided.

18 Claims, 3 Drawing Sheets

U.S. PATENT DOCUMENTS

| | | |
|---|---|---|
| 7,052,532 B1 * | 5/2006 | Liu et al. .................... 96/154 |
| 7,655,064 B2 * | 2/2010 | Kato et al. ................... 55/521 |
| 2003/0037675 A1 * | 2/2003 | Gillingham et al. .......... 95/280 |
| 2004/0074094 A1 * | 4/2004 | Bruck ........................... 29/890 |
| 2004/0105792 A1 | 6/2004 | Worner et al. |
| 2005/0022382 A1 | 2/2005 | Bruck et al. |
| 2005/0170957 A1 * | 8/2005 | Maus et al. .................. 502/439 |
| 2005/0268788 A1 * | 12/2005 | Kaiser .......................... 96/417 |
| 2006/0039837 A1 * | 2/2006 | Bruck et al. ................. 422/180 |
| 2006/0213165 A1 * | 9/2006 | Isomura et al. ............... 55/523 |

FOREIGN PATENT DOCUMENTS

| | | |
|---|---|---|
| DE | 203 09 398 U1 | 10/2003 |
| DE | 102 54 036 A1 | 6/2004 |
| JP | 2002-161740 | 6/2002 |
| RU | 2198302 C2 | 2/2003 |
| WO | WO 03/074925 A1 | 9/2003 |
| WO | WO2004081353 * | 9/2004 |

* cited by examiner

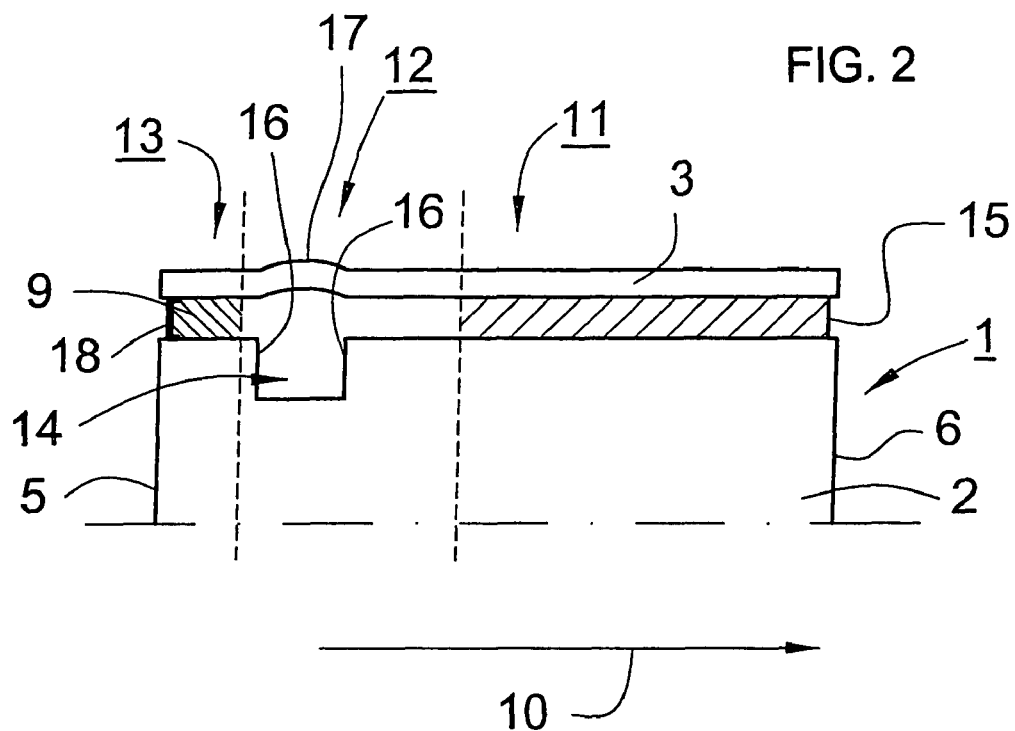
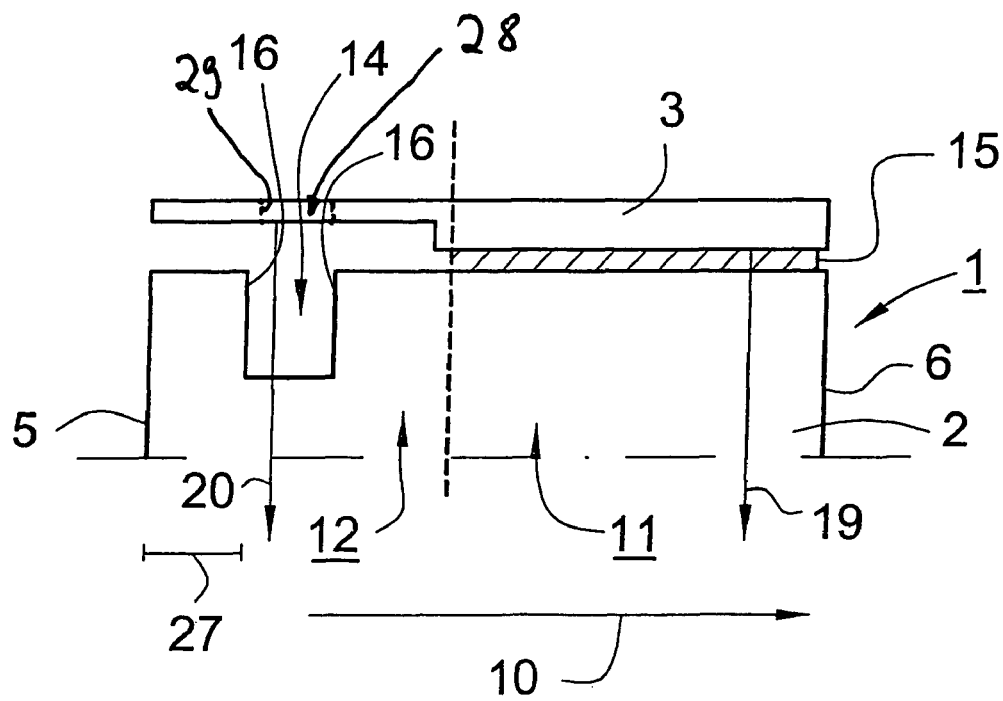

HONEYCOMB BODY WITH AN AT LEAST PARTIALLY CERAMIC HONEYCOMB STRUCTURE AND A RECEPTACLE FOR A MEASUREMENT SENSOR, AND PROCESS FOR PRODUCING SUCH A HONEYCOMB BODY

CROSS-REFERENCE TO THE RELATED APPLICATION

This is a continuation, under 35 U.S.C. §120, of copending International Application No. PCT/EP2005/013965, filed Dec. 23, 2005, which designated the United States; this application also claims the priority, under 35 U.S.C. §119, of German Patent Application No. DE 10 2004 063 546.3, filed Dec. 30, 2004; the prior applications are herewith incorporated by reference in their entirety.

BACKGROUND OF THE INVENTION

Field of the Invention

The invention relates to a honeycomb body having an at least partially ceramic honeycomb structure through which a fluid can flow. The honeycomb structure has cavities and is disposed in a tubular casing. Such a honeycomb body is preferably used in the exhaust system of a motor vehicle, in particular as a catalyst carrier body or filter body. The invention also relates to a process for producing a corresponding honeycomb body.

Honeycomb bodies are often constructed with a metallic or ceramic honeycomb structure. Such honeycomb bodies are used in exhaust systems of motor vehicles, such as for example automobiles, in particular as catalyst carrier bodies or filter bodies as well. There are numerous countries throughout the world which have set limits on certain components in the exhaust gas from automobiles. Those limits can generally only be complied with by catalytically treating the exhaust gas from the internal combustion engines. The very high conversion rates which are increasingly required for certain components of the exhaust gas can only be achieved by making an increased reaction surface area available to the exhaust gas. Therefore, in order to ensure that it is not necessary to install excessively large honeycomb bodies, there is a trend toward honeycomb bodies with a very high cell density, i.e. a very large number of cavities or cavities per unit cross-sectional area. However, that means that the walls which delimit the cavities have to be made considerably thinner as compared to honeycomb bodies with a lower cell density. At the same time, in order to comply with statutory limits, many exhaust systems require regulation from an engine control, which makes it imperative to measure the composition of the exhaust gas through the use of a measurement sensor in the exhaust system. By way of example, lambda sensors are often used in the exhaust system to obtain information about an air/fuel ratio.

However, particularly in the case of ceramic honeycomb structures, the introduction of a lambda sensor or in general terms of a measurement sensor into the honeycomb structure weakens the honeycomb structure, since it has to be provided in a subregion with a recess in which the measurement sensor engages. That type of initial weakening of the honeycomb structure, however, generally leads, in particular in the case of a force-locking and/or form-locking connection of the tubular casing to the honeycomb structure, to it being damaged further by the existing weakening of the honeycomb structure. Since constant heating and cooling processes occur in the exhaust system when the honeycomb body is operating, leading to strong thermal gradients and/or transients in the honeycomb body, that leads to slowly advancing damage to the honeycomb structure due to the altered force acting from the outside from the tubular casing as a result. A force-locking connection is one which connects two elements together by force external to the elements, as opposed to a form-locking connection which is provided by the shapes of the elements themselves.

SUMMARY OF THE INVENTION

It is accordingly an object of the invention to provide a honeycomb body with an at least partially ceramic honeycomb structure and a receptacle for a measurement sensor, and a process for producing such a honeycomb body, which overcome or at least reduce the hereinafore-mentioned disadvantages and problems of the heretofore-known devices and processes of this general type and in which a tubular casing is connected to the honeycomb structure in such a way that, despite a recess for a measurement sensor being formed in the honeycomb structure, on one hand the honeycomb structure is reliably held in the tubular casing, and on the other hand progressive damage to the honeycomb structure is avoided.

With the foregoing and other objects in view there is provided, in accordance with the invention, a honeycomb body, in particular for an exhaust system of a motor vehicle, comprising a tubular casing and an at least partially ceramic honeycomb structure through which a fluid can flow. The honeycomb structure is disposed in the tubular casing and has cavities. At least two axial subregions are disposed along a longitudinal direction of the honeycomb body. The at least two axial subregions include at least one axial securing region and at least one axial measurement sensor region. The honeycomb structure is connected to the tubular casing in the at least one axial securing region. The at least one axial measurement sensor region has a recess formed therein for accommodating at least one measurement sensor in the honeycomb structure.

In particular, in a honeycomb body according to the invention, the honeycomb structure is connected to the tubular casing only in the securing region. Furthermore, it is preferable for there to be no direct connection between the tubular casing and the honeycomb structure in the measurement sensor region. In the present context, a motor vehicle is to be understood as meaning, in particular, an automobile, such as a passenger automobile or a truck, a motorized two-wheeler, a quad bike, a boat and/or an aircraft. An at least partially ceramic honeycomb structure in the context of the present invention may also have metallic parts, for example metallic reinforcing or guiding elements, which are incorporated in the ceramic walls. Preference is given to honeycomb structures which are produced by extrusion. The honeycomb structure may have walls which are impermeable to a fluid, such as for example exhaust gas, so that in this case a fluid can flow through the cavities, for example passages. However, it is also possible for at least part of the walls to be formed from a porous material, in particular a porous ceramic. At least some of the cavities of the honeycomb structure may also be closed. The honeycomb body according to the invention is suitable, in particular, for use as a catalyst carrier body or as a filter body, and particularly preferably also as a diesel particulate filter.

It is preferable for the tubular casing to have a hole through which the measurement sensor can pass. The dimensions of this hole are preferably substantially identical to the dimensions of the recess in the honeycomb structure. Furthermore, it is advantageously possible for a connection, in particular in a gastight manner, of the measurement sensor to the honeycomb body to be formed, in particular a screw thread which interacts with a screw thread on the measurement sensor.

In the honeycomb body according to the invention, a measurement sensor can be introduced into the recess in the honeycomb structure. Although this recess weakens the honeycomb structure, it cannot lead to progressive damage to the honeycomb structure, since a corresponding securing is formed in the securing region. In particular, a force-locking, form-locking and/or materially cohesive connection between the tubular casing and the honeycomb structure can be formed in the securing region. Furthermore, according to the invention, it is possible for an intermediate element, which can in particular also produce the connection, to be formed between the tubular casing and the honeycomb structure. This may, for example, be a swellable mat. A swellable mat is formed in particular of a mixture of various ceramic fibers and minerals, which if appropriate are bonded by paper fibers to improve their handling properties. Vermiculite particles, for example, are introduced into the swellable mat as mineral fractions. Vermiculite is a sheet silicate which at high temperatures expands through the use of a reversible release of water in order to change the thickness of the swellable mat. This can be used in particular to actively clamp the honeycomb structure in the tubular casing when the operating temperature rises. Therefore, in the case of a force-locking and/or form-locking connection between the tubular casing and the honeycomb structure, this connection is retained even at relatively high temperatures, such as the operating temperature of the catalyst carrier body. The honeycomb body according to the invention allows a high degree of operational reliability without damage to the honeycomb body even for prolonged periods of time, since the holding forces used to produce a connection between the tubular casing and the honeycomb structure are preferably introduced only in the securing region.

In accordance with another feature of the invention, the honeycomb body includes an axial sealing region in which a seal or sealing device is formed between the honeycomb structure and the tubular casing.

This seal advantageously prevents a bypass flow of the exhaust gas around the honeycomb structure. A structure of the seal which produces a seal over the entire circumferential region is particularly preferred. In such a case, the seal is preferably formed over the entire circumference. A suitable seal is in particular a ceramic fiber mat, a swellable mat and/or mica. It is particularly advantageous for the seal to be constructed in such a way that in the sealing region there is substantially no force-locking and/or form-locking connection between the tubular casing and the honeycomb structure. However, it is also possible and in accordance with the invention to provide just a very weak attachment in this region, so that the forces which occur upon heating of a swellable mat constructed as a seal are so low that there is no damage to the honeycomb structure in the sealing region and/or in the measurement sensor region.

In accordance with a further feature of the invention, the measurement sensor region is formed between the sealing region and the securing region in the longitudinal direction. In particular, the sealing region is formed in the region of an end side of the honeycomb body.

The sealing region then particularly advantageously prevents the exhaust gas from flowing around the honeycomb structure, which would lead to a lower conversion rate being achieved in the front end region of the honeycomb body than in the rear region.

In accordance with a further feature of the invention, it is advantageous for the sealing region to include a blow-out protector in the direction of the end side of the honeycomb body. A blow-out protector serves to prevent the sealing region from blowing out. The sealing region may blow out, for example, as a result of the strongly pulsating exhaust gas striking the end side of the sealing region. The blow-out protector may, for example, include a thin metal foil which is laid around the end-face region of the sealing region and is preferably connected to it by technical joining. The preferred manner of producing the technical joining connection is by brazing. However, a sintering process or even welding may be used as well. A force-locking and/or form-locking connection between the blow-out protector and the sealing region is also possible in accordance with the invention. By way of example, it is possible to produce a flanged or other mechanical form of clamping between the blow-out protector and the sealing regions. It is particularly preferable for a blow-out protector to be formed in the region of a gas-inlet end side of the honeycomb body.

In accordance with an added feature of the invention, the connection between the honeycomb structure and the tubular casing is constructed in at least one of the following ways:
a) force-locking;
b) form-locking; or
c) materially cohesive.

In this context, it is preferable to form a force-locking or form-locking connection between the tubular casing and the honeycomb structure in the securing region through the use of a press fit. Preference is given in this context to providing a swellable mat between the honeycomb structure and the tubular casing, at least in the securing region.

It has proven particularly advantageous for the connection between the tubular casing and the honeycomb structure to be configured in such a way that the holding forces introduced in the securing region are greater, preferably considerably greater, than the holding forces which may be introduced into the honeycomb structure in the sealing region and/or the measurement sensor region. This also applies in particular to the mean holding force taken over the possible range of temperatures to which a honeycomb body is exposed. In particular, the connection is configured in such a way that there is no temperature within this temperature range, preferably up to a temperature of 900° C., at which the holding force in the securing region is less than or equal to the holding force in the sealing region and/or the measurement sensor region. A structure of the connection between the tubular casing and the honeycomb structure in which the quotient of a holding force in the securing region to a holding force in the sealing region and/or the measurement sensor region is greater than or equal to 1.5, preferably greater than or equal to 2, particularly preferably greater than or equal to 3 or even 4, is also preferred. It is also preferable for these relationships to also apply to mean holding forces, in which case this mean may be taken in the axial, radial and/or circumferential direction or also over a temperature range, preferably the range of temperatures to which the honeycomb body is exposed during operation in the exhaust system of a motor vehicle.

In accordance with an additional feature of the invention, in the securing region, a connection between the tubular casing and the honeycomb structure is formed in axial and/or circumferential subregions.

Consequently, the tubular casing does not have to be connected to the honeycomb structure throughout the entire securing region. It is possible to form both circumferential and axial subregions in which the connection is produced. This can be done in particular by corresponding subregions of the tubular casing having a smaller internal diameter than other subregions or by a mat positioned between the tubular casing and the honeycomb structure having subregions with different intumescent properties or also subregions of different thicknesses. As an alternative and/or in addition, it is also preferable for corresponding regions of larger external diameter to be formed on the honeycomb structure.

In accordance with yet another feature of the invention, at least in a subregion, a flexible and/or elastic mat is formed between the honeycomb structure and the tubular casing.

This may preferably be a swellable mat, a fiber mat, in particular a ceramic fiber mat, and/or a mat containing mica.

In accordance with yet a further feature of the invention, at least in a subregion, a swellable mat, a ceramic fiber mat and/or an intermediate layer of mica is formed between the honeycomb structure and the tubular casing.

In particular, in this case the entire honeycomb structure may be surrounded by a mat, which accordingly has a subregion corresponding to the securing region. Corresponding intumescent subregions could be formed in this subregion, leading to the production of a force-locking and/or form-locking connection between the tubular casing and the honeycomb structure, even when the honeycomb structure and/or the tubular casing heats up. A mat of this type may have a further subregion which corresponds to the measurement sensor region. No intumescent regions are formed in this subregion, and furthermore, this region has a hole for the measurement sensor to pass through. If appropriate, a region which is intumescent may be formed in a further subregion, corresponding for example to a sealing region.

In accordance with yet an added feature of the invention, the tubular casing, in the measurement sensor region, has a second internal diameter which is larger than a first internal diameter of the securing region.

This constitutes a further measure according to the invention of restricting a force-locking connection between the tubular casing and the honeycomb structure substantially to the securing region. If, in such a case, a swellable mat is provided between the tubular casing and the honeycomb structure, the enlarged second internal diameter in the measurement sensor region, given a suitable configuration of the swellable mat with regard to its intumescent properties, leads to a force-locking connection being produced, in the cold state, only in the securing region, whereas in the measurement sensor region there is no force-locking connection between the tubular casing and the honeycomb structure. Even when the honeycomb body is heated, this does not lead to the exertion of forces in the measurement sensor region if the difference between the thickness of the swellable mat in the heated state and the thickness in the cold state is suitably matched to the difference between the second internal diameter and the first internal diameter.

In accordance with yet an additional feature of the invention, the tubular casing, at least in the measurement sensor region, curves convexly outward at least in circumferential and/or axial subregions. In this context it is particularly preferred if in the region of the recess for the measurement sensor there is a circumferential subregion which is curved convexly outward. In this way, an introduction of forces as a result of the different thermal expansion properties of the tubular casing and the honeycomb structure is even more reliably avoided in this sensitive subregion.

In accordance with again another feature of the invention, the recess is formed at a distance of between 20 and 60 mm, preferably between 30 and 50 mm, particularly preferably between 35 and 45 mm, behind an end side of the honeycomb body.

In this case, the distance can be calculated to a central point of the recess for the measurement sensor. However, it is equally possible for one of the edge points of this recess to be used as a reference point. In particular, in the case of long honeycomb bodies, it is therefore advantageous for a measurement sensor to be formed in the region of the front third of the honeycomb body.

With the objects of the invention in view, there is also provided a process for producing a honeycomb body. The process comprises the following steps:
a) providing an at least partially ceramic honeycomb structure through which a fluid can flow and which has at least one recess formed therein for accommodating a measurement sensor;
b) providing a tubular casing having at least one hole formed therein for the measurement sensor to pass through;
c) introducing the honeycomb structure into the tubular casing and joining the honeycomb structure to the tubular casing in at least one axial securing region; and
d) before or during step c), mutually aligning the honeycomb structure and the tubular casing, causing the hole in the tubular casing and the recess in the honeycomb structure to at least partially overlap one another after step c).

Therefore, before or during step c), the honeycomb structure and the tubular casing are aligned relative to one another, ensuring that the hole in the tubular casing, following step c), lies above the recess in the honeycomb structure, in such a way that the measurement sensor can be introduced through the hole into the recess, i.e. the hole and recess in particular at least partially overlap one another. Therefore, in particular before the honeycomb structure is introduced into the tubular casing, it is possible first of all to align the longitudinal axes of the honeycomb structure and the tubular casing in parallel, after which the honeycomb structure and/or the tubular casing can be rotated until the orientation of the hole and the recess coincide in such a way that the hole and the recess overlap one another after the honeycomb structure has been introduced into the tubular casing. The honeycomb structure is then introduced into the tubular casing.

In accordance with another mode of the invention, in particular, before and/or during step c) an intermediate layer can be introduced between the honeycomb structure and the tubular casing. It is preferable for the intermediate layer to include at least one of the following materials:
a swellable mat,
a ceramic fiber mat,
an intermediate layer of mica,
a porous metallic mat,
an elastic mat, and
a flexible mat.

In accordance with another mode of the invention, it is preferable for the intermediate layer to be inhomogeneous. In particular, the compressibility, the thickness of the intermediate layer and/or the temperature-dependent nature of the expansion properties may vary over the intermediate layer, so that an intermediate layer of this type can be used to form a spatially selective connection between the tubular casing and the honeycomb structure, in particular exclusively in at least one securing region. In principle, the connection between the tubular casing, and the honeycomb structure is preferably force-locking. That part of the intermediate layer which corresponds to the securing region is constructed in such a way that the connection between the tubular casing and the honeycomb structure is retained even in the event of heating of the tubular casing and/or the honeycomb structure. A porous metallic mat is to be understood, in particular, as meaning a knitted wire mat.

In accordance with a further mode of the invention, step c) includes joining together at least two tubular casing parts around the honeycomb structure. This is a process known as multi-shell canning, which is used in particular as two-shell canning. In this case, the tubular casing is composed of two halves which are joined together. The connection between the tubular casing parts in this case is preferably materially cohesive, in particular formed by welding. Joining the tubular casing parts together preferably compresses an intermediate layer, for example a swellable mat, located between the tubular casing part and the honeycomb structure, at least in subregions, in such a way that a force-locking connection is produced between the tubular casing and the honeycomb structure by the intermediate layer.

In accordance with an added mode of the invention, in step c):
the honeycomb structure is surrounded with a compressible mat, and
the honeycomb structure surrounded by the mat is pressed into the tubular casing, compressing the mat.

This is a process known as plug canning. The compression of the mat produces a force-locking connection between the tubular casing and the honeycomb structure.

In accordance with a concomitant mode of the invention, in step c), the tubular casing is wound in at least one layer around the honeycomb structure.

The details and advantages which have been disclosed for the honeycomb body according to the invention can also be applied and transferred to the process according to the invention. In the same way, the details and advantages which have been disclosed for the process according to the invention can also be applied and transferred to the honeycomb body according to the invention.

Other features which are considered as characteristic for the invention are set forth in the appended claims.

Although the invention is illustrated and described herein as embodied in a honeycomb body with an at least partially ceramic honeycomb structure and a receptacle for a measurement sensor, and a process for producing such a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a fragmentary, longitudinal-sectional view of another exemplary embodiment of a honeycomb body according to the invention;

FIG. 3 is a fragmentary, longitudinal-sectional view of a further exemplary embodiment of a honeycomb body according to the invention;

DESCRIPTION OF THE INVENTION

Figure 1:
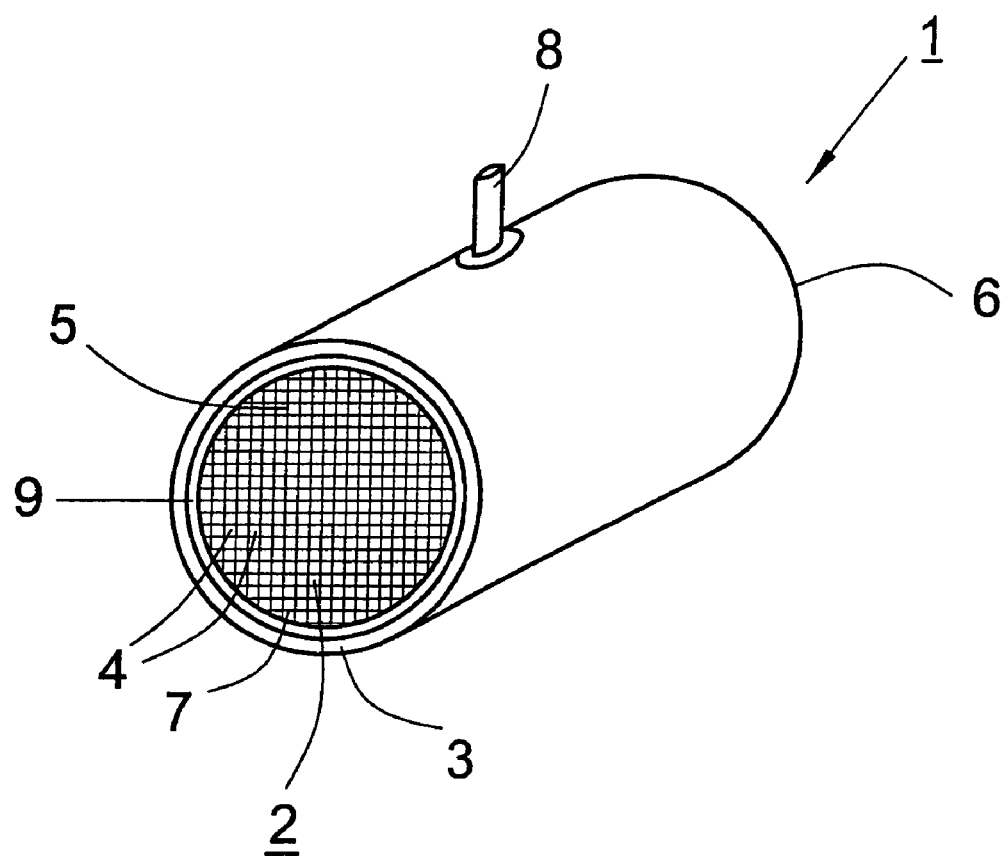
FIG. 1 is a diagrammatic, perspective view of an exemplary embodiment of a honeycomb body according to the invention.

Referring now to the figures of the drawings in detail and first, particularly, to FIG. 1 thereof, there is seen a honeycomb body 1 according to the invention, including a ceramic honeycomb structure 2 in a tubular casing 3. The honeycomb structure 2 has a plurality of cavities 4 through which a fluid can flow. In the present exemplary embodiment, the cavities 4 extend continuously from a first end side 5 to a second end side 6 of the honeycomb body 1. However, it is also possible for at least some of the cavities 4 to be at least partially closed. In particular, it is also possible for walls 7 which form the cavities 4 to be at least partially permeable to a fluid, in particular to be porous. It is thus also possible to form honeycomb bodies 1 according to the invention which in addition to a function, for example, as a catalyst carrier body, also perform a function of a particulate filter. A coating, in particular a catalytically active coating, preferably based on washcoat, can be formed on the walls 7.

Furthermore, the honeycomb body 1 has a measurement sensor 8. The measurement sensor 8 is preferably a lambda sensor, although the measurement sensor 8 may, as an alternative or in addition, also perform further functions, for example the function of a temperature sensor, of a gas concentration sensor, etc. A seal or sealing device 9 is formed in the region or vicinity of the first end side 5.

FIG. 2 diagrammatically depicts a longitudinal section through another exemplary embodiment of the honeycomb body 1 according to the invention. The honeycomb body 1 of the present exemplary embodiment has three axial subregions 11, 12, 13 in a longitudinal direction 10. In an axial securing region 11, the tubular casing 3 is connected to the honeycomb structure 2. Furthermore, the honeycomb body 1 has an axial measurement sensor region 12, in which a recess 14 is formed for accommodating a measurement sensor 8 in the honeycomb structure 2. Additionally, in the present exemplary embodiment, there is an axial sealing region 13, in which a seal 9 is formed between the tubular casing 3 and the honeycomb structure 2.

In the present exemplary embodiment, a supporting mat 15 is formed between the tubular casing 3 and the honeycomb structure 2 in the securing region 11. The supporting mat 15 may, for example, be a swellable mat, a fiber mat, in particular a ceramic fiber mat, and/or a layer of mica. It is preferable for the supporting mat to have the property of expanding as the temperature rises. This can be achieved, for example, by incorporating vermiculite in the mat. Vermiculite expands at high temperatures, in particular in a range of from 300° C. to 700° C. These thermal expansion properties of the supporting mat 15 can be exploited to counteract the different thermal expansion of the tubular casing 3 and the honeycomb structure 2. If the honeycomb structure 2 is connected in a force-locking and/or form-locking manner to the tubular casing 3, an intumescent supporting mat 15 of this type can be used to produce the force-lock and/or form-lock even in the heated state of the honeycomb body.

Supporting mats 15, in particular if they are intumescent, i.e. expand thermally, lead to a temperature-dependent force acting on the honeycomb structure 2. The honeycomb structure 2, in particular the walls 7 of the honeycomb structure 2, are constructed in such a way that they can substantially absorb at least the highest forces which the supporting mat 15 exerts on the honeycomb structure 2 during heating.

The recess 14, which is formed in the measurement sensor region 12, has recess edges 16. The recess 14 is used to accommodate a measurement sensor 8 in the honeycomb structure 2. The recess 14 also weakens the honeycomb structure 2 in the measurement sensor region 12, and consequently in this region the forces which can be absorbed by the honeycomb structure 2 are lower than in the securing region 11. In order to avoid damage to the honeycomb structure 2 in the measurement sensor region 12, the invention proposes that the introduction of force into the honeycomb structure 2 be reduced in the measurement sensor region 12 as compared to the securing region 11, or that no corresponding force be introduced in the measurement sensor region 12. According to the invention, this can be achieved, for example, by providing no supporting mat 15, or alternatively a mat which is not intumescent, in the measurement sensor region 12, at least in the circumferential region of the recess 14, and if appropriate in adjacent regions to be selected in a suitable size. This can be implemented, for example, by a corresponding supporting mat 15 being provided with a hole in the region of the recess or by a multi-part supporting mat 15 being used.

As an alternative or in addition, according to the invention it is possible for the tubular casing 3 to be curved convexly outward in the measurement sensor region 12, at least in subregions 17. In particular, the subregion 17 may be a circumferential and/or axial subregion 17 of the measurement sensor region 12. This measure likewise advantageously reduces and/or avoids the introduction of force into the honeycomb structure 2 in the measurement sensor region 12.

Furthermore, the sealing region 13 is provided in the present exemplary embodiment. The seal or sealing device 9 is formed between the tubular casing 3 and the honeycomb structure 2 in the sealing region 13. This seal may preferably be a swellable mat, a fiber mat and/or mica. In particular, the supporting mat 15 and the seal 9 may be a correspondingly constructed single-piece mat with appropriate cutouts in the measurement sensor region 12. The seal 9 serves, in particular, to prevent or reduce a bypass flow of the exhaust gas past the honeycomb structure 2. If appropriate, the seal 9 may be intumescent at least in subregions. In this case, it is recommended in particular for the subregion which is formed at an end side 5, 6 of the honeycomb body 1 to be constructed to be intumescent. This achieves a particularly good sealing action in this region. In such a case, the seal 9 is to be constructed in such a way that the introduction of force based on intumescence in this region does not lead to damage to the honeycomb structure 2. In this context it is particularly advantageous for a corresponding region of the seal to be selected to be as small as possible.

Furthermore, the seal 9 preferably includes a blow-out protector 18 in the direction of an end side 5, 6 of the honeycomb body 1. This blow-out protector 18 may be formed, for example, by a preferably thin metal sheet which is suitably connected in a force-locking, form-locking and/or materially cohesive manner in this region of the seal 9.

FIG. 3 shows a longitudinal section through a further exemplary embodiment of a honeycomb body 1 according to the invention. The honeycomb body 1 includes a honeycomb structure 2 which is held in a tubular casing 3. In a longitudinal direction 10, the honeycomb body 1 includes a securing region 11 and a measurement sensor region 12. In the securing region 11, a supporting mat 15, which expands under the action of heat in order to compensate for different thermal expansion properties of the tubular casing 3 and the honeycomb structure 2, is formed between the tubular casing 3 and the honeycomb structure 2. In the measurement sensor region 12, there is a recess 14 with recess edges 16 for accommodating a measurement sensor 8. The recess 14, or the measurement sensor region 12, is disposed at a distance 27 of between 20 and 60 mm, preferably between 30 and 50 mm, particularly preferably between 35 and 45 mm, from the end side 5 of the honeycomb body 1. In order to further reduce the introduction of force onto the honeycomb structure 2, the tubular casing 3, in accordance with the invention, has two internal diameters 19, 20. The first internal diameter 19 is present in the securing region 11, while the second internal diameter 20 is present in the measurement sensor region 12. The first internal diameter 19 is smaller than the second internal diameter 20, which means that forces can only act on the honeycomb structure 2 from the tubular casing 3 in the securing region 11. In the present exemplary embodiment, the edge of the supporting mat 15 does not coincide with the region of the tubular casing 3 in which the internal diameter changes from the first internal diameter 19 to the second internal diameter 20. However, these two points may also coincide. FIG. 3 also shows, by way of example, a hole 28 with a hole edge 29 in the tubular casing 3. The hole 28 and the recess 14 at least partially overlap with one another, so that a measurement sensor can be introduced into the recess 14 through the hole 28. Reference may be made to FIG. 2 for further details.

Figure 4:
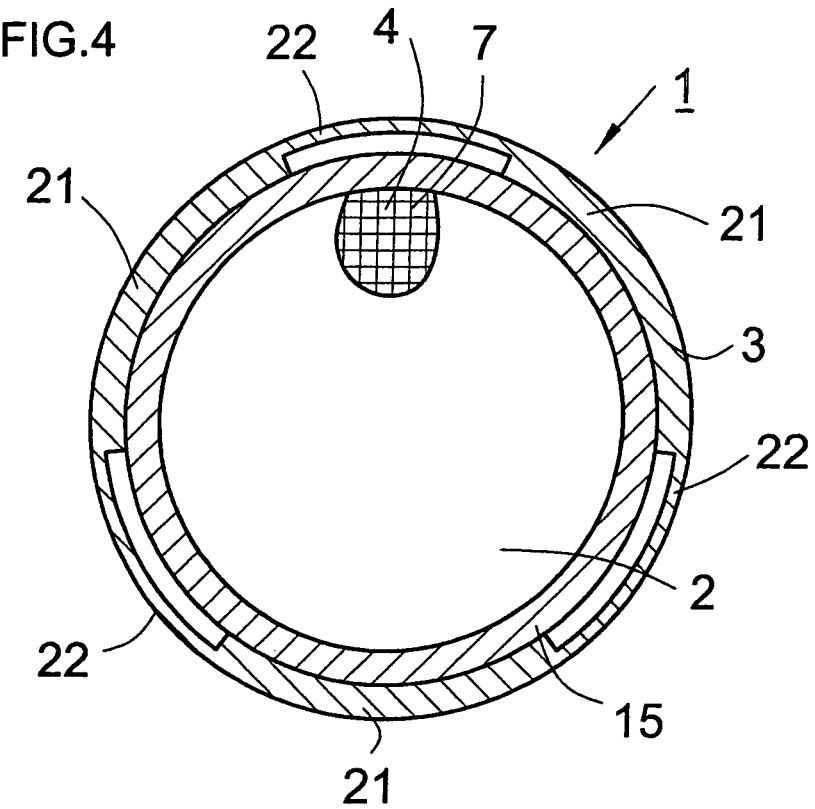
FIG. 4 is a cross-sectional view of an additional exemplary embodiment of a honeycomb body according to the invention.

FIG. 4 shows a cross section through a further exemplary embodiment of a honeycomb body according to the invention. The cross section is taken in the securing region 11. The honeycomb body 1 includes a tubular casing 3 and a honeycomb structure 2 with cavities 4 which are delimited by walls 7 and are only indicated in a subregion of the drawing for the sake of clarity. A supporting mat 15 is formed between the tubular casing 3 and the honeycomb structure 2. In the securing region 11, the tubular casing 3 has first subregions 21 and second subregions 22. The first subregions 21 in this case have a smaller internal diameter than the second subregions 22. As a result, holding forces are only introduced into the honeycomb structure 2 in certain circumferential subregions 21 of the honeycomb body 1. The spatial formation of the subregions 21, 22 may in this case be either symmetric or asymmetric in both the axial direction and the circumferential direction. In the context of the present invention, a subregion in the circumferential direction is to be understood as meaning a subregion which is not formed over the entire circumference of the cross section of the honeycomb structure 2, but rather only part of it. The spatial extent, in particular in the circumferential direction of the subregions 21, 22, may also vary from subregion 21, 22 to subregion 21, 22.

Figure 5:
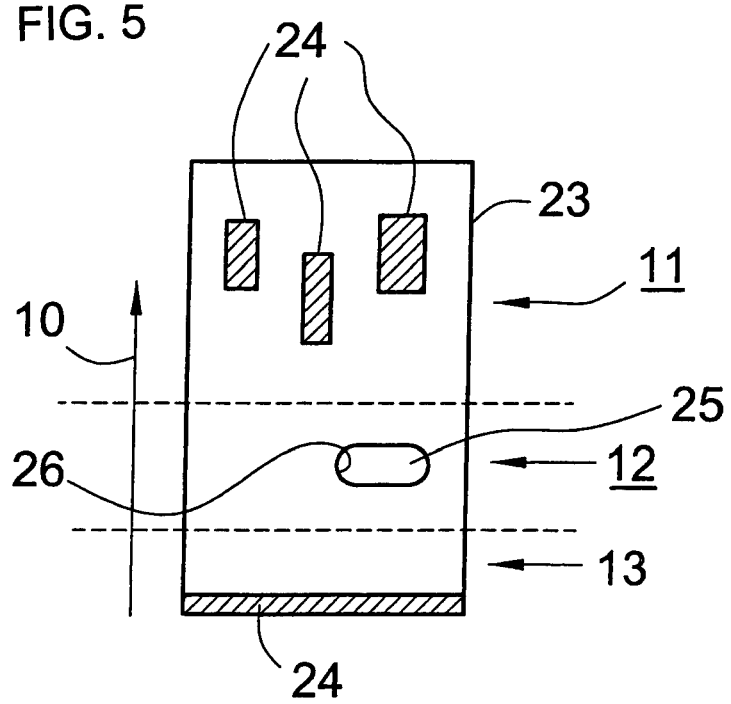
FIG. 5 is a plan view of a mat, in particular for producing a connection between a tubular casing and a honeycomb structure of a honeycomb body according to the invention.

FIG. 5 shows a mat 23 which can be used, in particular, to form a honeycomb body 1 according to the invention. The mat 23 is preferably a swellable mat and/or a ceramic fiber mat. It is also preferable, as an alternative or in addition, to provide a layer which at least partially includes mica. In the honeycomb body 1 according to the invention, the mat 23 is located between the tubular casing 3 and the honeycomb structure 2. The subregions 11, 12, 13 of the honeycomb body 1 lying in the longitudinal direction can already be recognized from the mat 23. In principle, the mat 23 is not intumescent, but intumescent regions 24 are formed therein. These intumescent regions 24 contain, for example, vermiculite which expands on heating. Therefore, an in particular force-locking and/or form-locking connection can be produced between the tubular casing 3 and the honeycomb structure 2 in the securing region 11. On heating, the intumescent regions 24 lead to compensation of the different thermal expansion properties of the tubular casing 3 and the honeycomb structure 2, so that even in the heated state, the force-locking and/or form-locking connection between the tubular casing 3 and the honeycomb structure 2 is retained. In what is subsequently the measurement sensor region 12, the mat 23 has a hole 25 which is delimited by a hole edge 26. When constructing the honeycomb body 1, this hole 25 is positioned in such a way that the hole 25 is located above the recess 14 in the honeycomb structure 2, so that when the measurement sensor 8 is being installed in the honeycomb body 1, it enters the recess 14 through the hole 25. In addition to allowing the measurement sensor 8 to pass through, the hole 25 also reduces the forces which are introduced into the honeycomb structure 2 in the region of the recess 14. Therefore, the hole 25, in particular in combination with the non-intumescent property of the mat 23 in the measurement sensor region 12, prevents damage to the honeycomb structure 2 during operation.

The mat 23 has a sealing property in what will subsequently be the sealing region 13. For this purpose, it may, for example, have a greater thickness in the sealing region 13 than in the measurement sensor region 12. Furthermore, it is also possible for an intumescent region 24 to be formed at the edge of the sealing region 13, which on heating results in the formation of a gap between the tubular casing 3 and the honeycomb structure 2, allowing the exhaust gas to bypass the honeycomb structure 2. It is preferable for the extent of this intumescent region 24 in the longitudinal direction 10 to be short as compared to the total extent of the sealing region 13 in the longitudinal direction 10. Furthermore, as an alternative or in addition, a blow-out protector 18 may be formed in this end-side region of the mat 23 as described above, in order to prevent the mat 23 from being blown out, for example due to the highly pulsating exhaust gas stream.

Due to its preferably force-locking and/or form-locking connection between the tubular casing 3 and the honeycomb structure 2 in the securing region 11, the honeycomb body 1 according to the invention has a more durable connection between the tubular casing 3 and the ceramic honeycomb structure 2. Furthermore, damage to the honeycomb structure 2 in the measurement sensor region 12 is advantageously avoided, despite the formation of the recess 14.

The invention claimed is:

1. A honeycomb body, comprising:
    a tubular casing;
    an extruded ceramic honeycomb structure through which a fluid can flow, said honeycomb structure being disposed in said tubular casing, said honeycomb structure having cavities and walls at least partially formed by porous material, said honeycomb structure having a circumferential outer surface;
    at least three axial subregions disposed along a longitudinal direction of the honeycomb body, said at least three axial subregions including at least one axial securing region, at least one axial sealing region and at least one axial measurement sensor region;
    at least one flexible or elastic mat disposed between said honeycomb structure and said tubular casing in said at least one axial securing region and said at least one axial sealing region;
    said honeycomb structure being connected to said tubular casing in said at least one axial securing region with a connection applying greater holding forces to said honeycomb structure in said at least one securing region than in said at least one measurement sensor region, said connection between honeycomb structure and said tubular casing being produced by said mat, said connection being a force locking connection through the use of a press fit, a quotient of holding force in said at least one securing region to a holding force in the sealing region is greater than or equal to two; and
    said at least one axial measurement sensor region having a recess formed therein for accommodating at least one measurement sensor in said honeycomb structure, said recess being formed in said circumferential outer surface, said at least one measurement sensor region being at least a circumferential region of the recess.

2. The honeycomb body according to claim 1, wherein said measurement sensor region is disposed between said sealing region and said securing region along said longitudinal direction.

3. The honeycomb body according to claim 1, wherein said sealing region is disposed in vicinity of an end side of the honeycomb body.

4. The honeycomb body according to claim 3, wherein said sealing region has a blow-out protector in direction of an end side of the honeycomb body.

5. The honeycomb body according to claim 1, which further comprises at least one connection between said honeycomb structure and said tubular casing being selected from the group consisting of:
    a) a form-locking connection; and
    b) a materially cohesive connection.

6. The honeycomb body according to claim 1, wherein said securing region has axial and circumferential subregions, and a connection between said tubular casing and said honeycomb structure is formed in at least one of said axial and circumferential subregions.

7. The honeycomb body according to claim 1, which further comprises at least one of a swellable mat, a ceramic fiber mat or an intermediate layer of mica disposed at least in a subregion between said honeycomb structure and said tubular casing.

8. The honeycomb body according to claim 1, wherein said tubular casing has a first internal diameter in said securing region and a second internal diameter in said measurement sensor region, and said second internal diameter is larger than said first internal diameter.

9. The honeycomb body according to claim 8, wherein said tubular casing curves convexly outward in at least one of circumferential or axial subregions, at least in said measurement sensor region.

10. The honeycomb body according to claim 1, wherein said measurement sensor region is disposed at a distance of between 20 and 60 mm from an end side of the honeycomb body.

11. The honeycomb body according to claim 1, wherein said measurement sensor region is disposed at a distance of between 30 and 50 mm from an end side of the honeycomb body.

12. The honeycomb body according to claim 1, wherein said measurement sensor region is disposed at a distance of between 35 and 45 mm from an end side of the honeycomb body.

13. A honeycomb body for an exhaust system of a motor vehicle, the honeycomb body comprising:
    a tubular casing;
    an at least partially ceramic honeycomb structure through which exhaust gas can flow, said honeycomb structure being disposed in said tubular casing, said honeycomb structure having cavities and walls at least partially formed by porous material, said honeycomb structure having a circumferential outer surface;
    at least three axial subregions disposed along a longitudinal direction of the honeycomb body, said at least three axial subregions including at least one axial securing region, at least one axial sealing region and at least one axial measurement sensor region;

at least one flexible or elastic mat disposed between said honeycomb structure and said tubular casing in said at least one axial securing region and said at least one axial sealing region;

said honeycomb structure being connected to said tubular casing in said at least one axial securing region with a connection applying greater holding forces to said honeycomb structure in said at least one securing region than in said at least one measurement sensor region, said connection between honeycomb structure and said tubular casing being produced by said mat, said connection being a force locking connection through the use of a press fit, a quotient of holding force in said at least one securing region to a holding force in the sealing region being greater than or equal to two; and said at least one axial measurement sensor region having a recess formed therein for accommodating at least one exhaust gas measurement sensor in said honeycomb structure, said recess being formed in said circumferential outer surface, said at least one measurement sensor region being at least a circumferential region of the recess.

14. The honeycomb body according to claim 1, wherein the quotient of holding force in said at least one securing region to a holding force in the sealing region is greater than or equal to three.

15. The honeycomb body according to claim 1, wherein the quotient of holding force in said at least one securing region to a holding force in the sealing region is greater than or equal to four.

16. The honeycomb body according to claim 13, wherein the quotient of holding force in said at least one securing region to a holding force in the sealing region is greater than or equal to three.

17. The honeycomb body according to claim 13, wherein the quotient of holding force in said at least one securing region to a holding force in the sealing region is greater than or equal to four.

18. A honeycomb body, comprising:

a tubular casing;

a ceramic honeycomb structure through which a fluid can flow, said honeycomb structure being disposed in said tubular casing, said honeycomb structure having cavities, said honeycomb structure having a circumferential outer surface;

at least three axial subregions disposed along a longitudinal direction of the honeycomb body, said at least three axial subregions including at least one axial securing region, at least one axial sealing region and at least one axial measurement sensor region;

at least one flexible or elastic mat disposed between said honeycomb structure and said tubular casing in said at least one axial securing region and said at least one axial sealing region;

said honeycomb structure being connected to said tubular casing in said at least one axial securing region with a connection applying greater holding forces to said honeycomb structure in said at least one securing region than in said at least one measurement sensor region, said connection between honeycomb structure and said tubular casing being produced by said mat, said connection being a force locking connection through the use of a press fit, a quotient of holding force in said at least one securing region to a holding force in the sealing region is greater than or equal to two; and said at least one axial measurement sensor region having a recess formed therein for accommodating at least one measurement sensor in said honeycomb structure.

* * * * *